A. Q. Allis' Mach.e for boring Post-Holes.

N° 74785

PATENTED
FEB 25 1868

Witnesses:
Theo. Tusche
W. Trevin

Inventor:
A. Q. Allis
Per Munn & Co.
Attorneys

United States Patent Office.

A. Q. ALLIS, OF DAYTON, OHIO.

Letters Patent No. 74,785, dated February 25, 1868.

IMPROVEMENT IN MACHINES FOR BORING POST-HOLES.

The Schedule referred to in these Letters Patent and making part of the same.

TO ALL WHOM IT MAY CONCERN:

Be it known that I, A. Q. ALLIS, of Dayton, in the county of Montgomery, and State of Ohio, have invented a new and improved Machine for Boring Post-Holes; and I do hereby declare that the following is a full, clear, and exact description thereof, which will enable those skilled in the art to make and use the same, reference being had to the accompanying drawings, forming part of this specification.

This invention relates to a machine for boring holes in the ground for fence-posts; and it consists in operating a vertical boring-bar by crank and gearing, and in an arrangement whereby the auger is fed down into the ground by a screw, and raised from the ground by a lever; and also in the manner in which the feeding-screw nut is made to engage with and is detached from the boring-bar; and also in a boring-tube, as will hereinafter be more fully described.

Similar letters of reference indicate corresponding parts.

Figure 2:
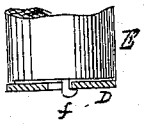
Figure 2 represents a longitudinal section of the boring-tube, showing the manner in which it is attached to the auger.
Figure 3:
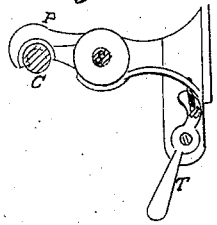
Figure 3 is a horizontal section through the line $x$ $x$, showing the manner in which the screw-feed is applied and detached.

The operating parts of this machine are attached to an upright post or stand, A, which is supported on a platform, marked B. C is the boring-bar or spindle, to the lower end of which the auger is attached. D is the auger. E is a tube, which rests upon and is attached to the auger by hooks on opposite sides, which hooks pass through holes in the auger, as seen in fig. 2 at $f$. The boring-bar C is of a square or angular form up to the point $g$, from whence it is rounded with a screw-thread cut upon it, as represented. H is a sleeve, with a square or angular hole, through which the bar passes, and to which the bevel-wheel J is attached. The sleeve H is supported by the horizontal arm K, in which arm it revolves with the bar, as a journal for the bar. L is another bevel-wheel, which engages with the wheel J, and which is supported on the horizontal driving-shaft $m$. This shaft $m$ is supported by the main post A, and by a short stand, $n$, on the transverse arm K, as seen in the drawing. $o$ is the crank, by which the machine is driven.

It will be seen that the gear-wheel J is rigidly attached to the sleeve H, and that the square boring-bar passes through the sleeve, which sleeve revolves in the arm K, consequently when the crank is turned the bar is revolved, and the auger operated. The auger is fed into the ground by a screw-thread cut in a half nut, $o'$, which is attached to the lever marked P. This lever P is supported by arms, $r$ $r$, (which project from the stand A,) on pivots or on an arbor, $s$, so that the lever, with the half nut, may be given a lateral motion, and the nut be thrown back and forth, so as to engage with the screw of the bar C, as may be desired. The lever P is operated by a cam-lever, T, to which it is attached by a flexible or jointed connection, as seen in the drawing. U is a lever, which passes over the top of the main stand A, one end of which lever is connected with the boring-bar, as seen. To the other end there is a chain or rope, V, for drawing down that end, and thereby raising the other with the boring-bar and auger.

Figure 1:
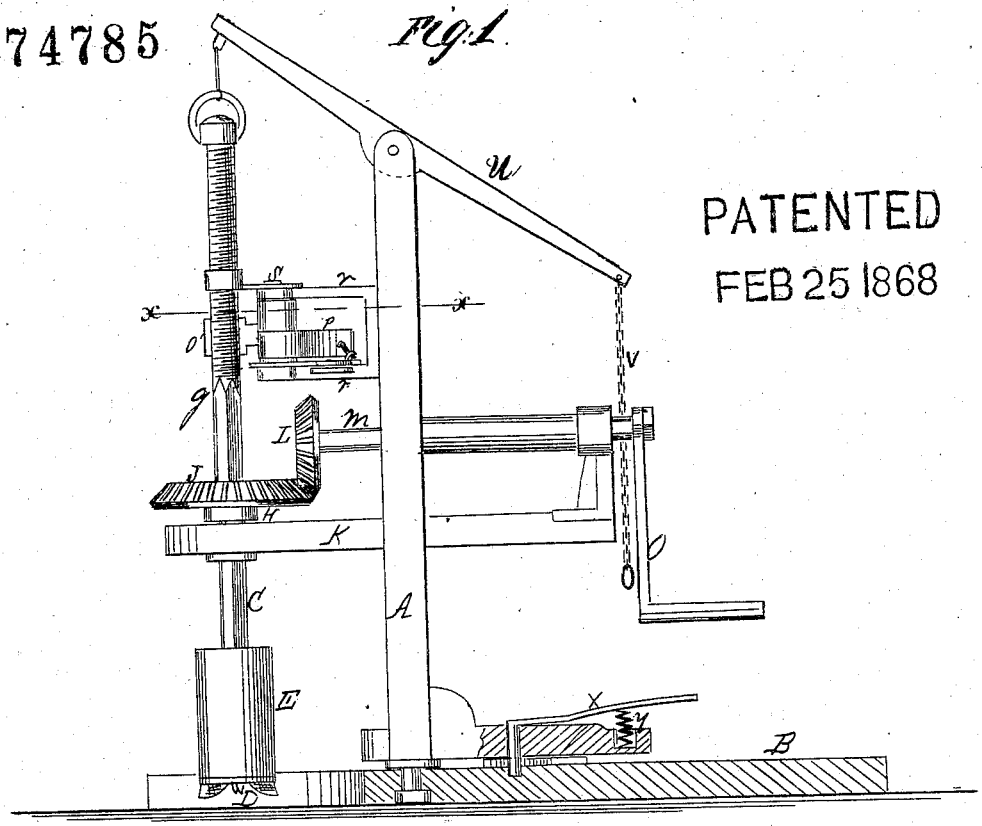
Figure 1 represents a side elevation of the machine, showing the parts of which it is composed, and the manner in which they are arranged.

When the auger is boring, it is fed down by the screw-attachment, which is thrown into gear for that purpose by operating the levers P and T, as before stated. When it is desired to raise the auger from the ground, the screws are disconnected and the bar is drawn up by the lever U, as seen in fig. 1. The tube E receives the earth when the auger is boring, so that when the auger is withdrawn from the hole the earth is retained in the tube, and may be swung round with the auger away from the hole, when it may be dumped. To allow of this swinging round the post or stand A is attached to the platform B by a pivot connection, as seen in the drawing. W is an arm on the bottom end of the stand, and X is a bent lever, by which the machine is held in a fixed position. When it is desired to swing the auger round, the end of the lever X is depressed, which withdraws the other end from the platform. When the machine is in position, the lever X is held in place by the spring $y$, as seen in the drawing.

Having thus described my invention, I claim as new, and desire to secure by Letters Patent—

1. The half nut $o'$, and the method of engaging and detaching the same from the boring-bar, substantially as and for the purposes described.

2. The tube E, in combination with the auger D, substantially as described, for the purposes set forth.

3. A post-hole-boring machine, so constructed as to swing round on the platform, substantially as and for the purposes described.

A. Q. ALLIS.

Witnesses:
CHARLES WILSON,
W. HAL. SIGMAN.